May 23, 1961     R. E. KUTCHERA     2,985,747
WELDING TITANIUM
Filed Nov. 27, 1959

INVENTOR.
Richard E. Kutchera
BY

Agent

United States Patent Office 2,985,747
Patented May 23, 1961

2,985,747
WELDING TITANIUM

Richard E. Kutchera, Cincinnati, Ohio, assignor to Titanium Metals Corporation of America, New York, N.Y., a corporation of Delaware Filed Nov. 27, 1959, Ser. No. 855,623

5 Claims. (Cl. 219—137)

This invention relates to the welding of titanium and titanium base alloys and more particularly to the welding of titanium to ferrous metals such as steel and stainless steel.

Weld joint embrittlement has been encountered in arc welds made between titanium and a number of dissimilar metals, particularly ferrous metals. This embrittlement is attributed to the dilution that takes place between the metals in the weld joint resulting in formation of brittle intermetallic compounds or excessive solid solution hardening.

A principal object of this invention is to provide an improved method for attaching a titanium article to a ferrous metal body. A further object of this invention is to provide a method for obtaining strong welded attachments between a titanium article and a ferrous metal body. A still further object of this invention is to provide a welded attachment between a titanium article and a ferrous metal body in which the welded joint is ductile. These and other objects of this invention will be apparent from the following description thereof.

This invention in its broadest aspects contemplates a method for attaching a titanium article to a ferrous metal body in which an inlay of vanadium is first fixedly attached into the surface of the ferrous metal body, and an edge of the titanium article is welded to the vanadium inlay. In a preferred embodiment this invention contemplates first perforating the titanium article and welding an edge of the wall of the perforation to the vanadium inlay previously attached into the surface of a ferrous metal body, and then filling the perforation in the titanium article with titanium metal.

The method of this invention will be more readily understood by reference to the annexed drawings in which.

Figure 1:
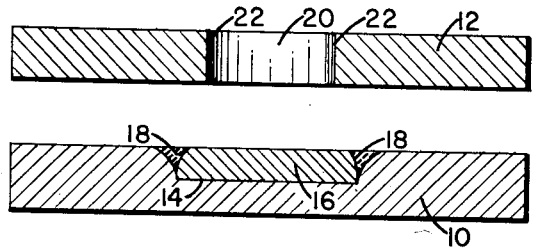
Fig. 1 shows a perforated titanium sheet and a steel plate with vanadium inlaid.

Referring now to Fig. 1, the ferrous metal plate, in this instance mild steel, is shown at 10 and the titanium article to be attached thereto is shown as sheet 12. A cavity 14 is first formed in a surface of plate 10 as by drilling, milling, routing or other convenient method, and in this cavity is placed an inlay of vanadium 16. Weld 18 fixedly attaches the inlay 16 to plate 10 and this weld is preferably accomplished by fusion welding as produced by an arc welder provided with a tungsten electrode. Perforation 20 is provided in sheet 10, and this may be formed by any convenient method such as drilling or boring. In Fig. 1 sheet 10 and plate 12 are shown in relative vertical positions but spaced apart for clarity.

Figure 2:
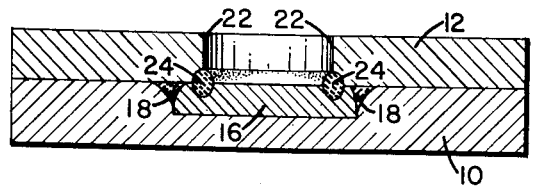
Fig. 2 shows the titanium sheet welded to the vanadium inlay.

Referring now to Fig. 2, the sheet 10 has been placed on plate 12 with the perforation 20 over vanadium inlay 16. The lower part of the edge of wall 22 of perforation 20 is then welded to vanadium inlay 16 as at 24. This weld is also preferably accomplished by fusion welding as produced by employment of an arc welder provided with a tungsten electrode.

Figure 3:
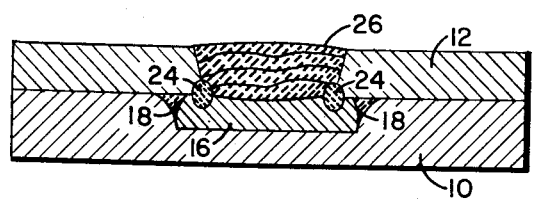
Fig. 3 shows the perforation in the titanium sheet filled and the attachment completed.

After welding of the edge of sheet 12 to the vanadium inlay 16, the perforation 20 is filled with titanium metal, as will be clear from Fig. 3. This is readily accomplished by employing titanium filler wire in an arc welder preferably of the type in which the welding is carried out in an atmosphere of inert gas, and making a sufficient number of passes in and over the perforation 20 to fill it with deposited titanium weld metal as at 26.

The following is presented as an example of the practice of the process of this invention.

*Example 1*

A sheet of ⅛ inch thick commercially pure titanium was attached to a ¼ inch mild steel plate by first drilling a quarter inch hole through the titanium sheet; and also drilling into the mild steel plate to form a pilot hole which was then counterbored to form a cavity 9/16 inch diameter by 1/16 inch deep. A disk of vanadium was inlaid in this cavity and its top outer edge was fusion welded to the adjacent mild steel edge using an arc welder with a tungsten electrode. After welding the weldment was ground flush with the surface of the steel plate and the titanium sheet placed on the steel plate with the hole in the titanium sheet over and generally concentric with the vanadium inlay in the steel plate. The lower edge of the sidewall of the hole in the titanium sheet was then welded to the adjacent surface of the vanadium inlay, employing the same tungsten electrode arc welder used for welding the vanadium inlay to the mild steel. Then an inert gas shielded arc welder employing titanium wire as a consumable electrode was used to deposit titanium filler metal over the vanadium and lower titanium edge weld and to fill the hole in the titanium sheet. Several passes of the titanium wire electrode provided titanium metal to seal the weldment and vanadium inlay surface at the bottom of the hole in the titanium sheet and to completely fill this hole.

The resulting attachment was found to be strong and not brittle. The exposed surface of the filled hole in the titanium sheet was found to be essentially the composition of the filler wire used, which was pure titanium, and was uncontaminated by dilution with either vanadium or iron.

It will be apparent that the problems of embrittlement by dilution of metals in welded joints has been overcome by the method herein described. Vanadium is readily welded to both ferrous metals and to titanium. The welds 18 between vanadium and the ferrous metal are readily obtained and will be found strong and ductile. The welds 24 in which the titanium edge is welded to the vanadium inlay may also be readily accomplished as described and these welds will be found also to be strong and ductile. The filler 26 of titanium metal can be deposited in the perforation 20 substantially as described and while the lower portion of this filler metal may contain some vanadium by dilution of inlay 16 and from welds 24, additional passes with the welding electrode will produce substantially pure filler metal at the upper portion and exposed surface of the filled perforation.

I claim:

1. A method for attaching a titanium article to a ferrous metal body which comprises; fixedly attaching an inlay of vanadium into a surface of said ferrous metal body and welding an edge of said titanium article to said vanadium inlay.

2. A method for attaching a titanium article to a ferrous metal body which comprises; forming a perforation in said titanium article, fixedly attaching a vanadium inlay into the surface of said ferrous metal body and welding the edge of said sheet forming the wall of said perforation to said vanadium inlay.

3. A method for attaching a titanium sheet to a ferrous metal body which comprises; forming a perforation in said titanium sheet, welding a vanadium inlay into a surface of said ferrous metal body, welding the edge of said sheet forming the wall of said perforation to said vanadium inlay, and filling said perforation with titanium.

4. A method for attaching a titanium sheet to a ferrous metal body which comprises; forming a perforation in said titanium sheet, welding a vanadium inlay into a surface of said ferrous metal body, welding the edge of said sheet forming the wall of said perforation to said vanadium inlay, and employing an arc welder using a titanium filler metal electrode to fill said perforation in said sheet with titanium.

5. A method for attaching a titanium sheet to a ferrous metal body which comprises; forming a perforation in said sheet, welding a vanadium inlay into a surface of said ferrous metal body and welding the edge of said sheet forming the wall of said perforation to said vanadium inlay employing an arc welder using a titanium filler metal electrode.

References Cited in the file of this patent

UNITED STATES PATENTS 2,416,379    Cohen _____ Feb. 25, 1947